Oct. 9, 1973 M. SCHNEIDER 3,764,433
METHOD OF MAKING A UTILITY BAG
Original Filed Oct. 21, 1968 5 Sheets-Sheet 1

INVENTOR.
Marvin Schneider

Oct. 9, 1973 M. SCHNEIDER 3,764,433
METHOD OF MAKING A UTILITY BAG
Original Filed Oct. 21, 1968 5 Sheets-Sheet 2

INVENTOR.
Marvin Schneider

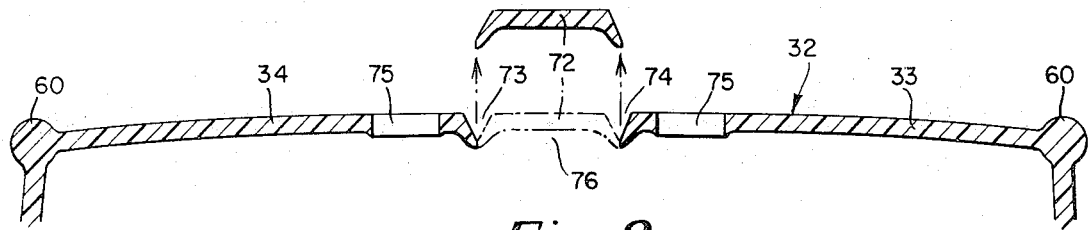
Fig. 9
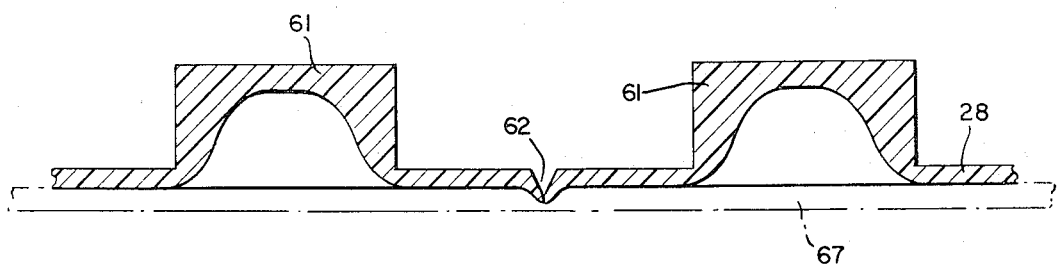
Fig. 11
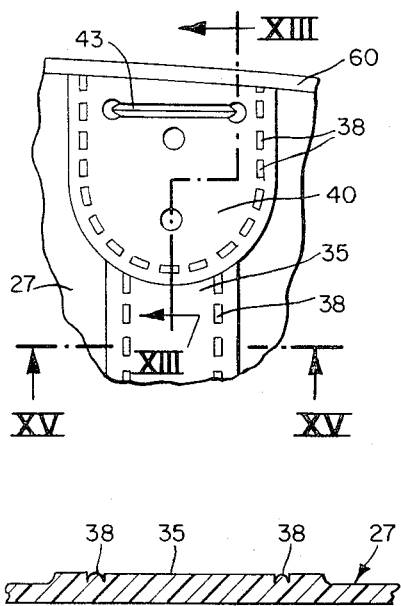
Fig. 12
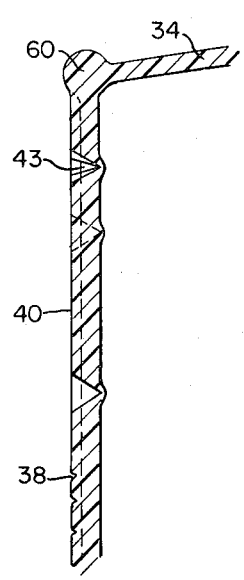
Fig. 13
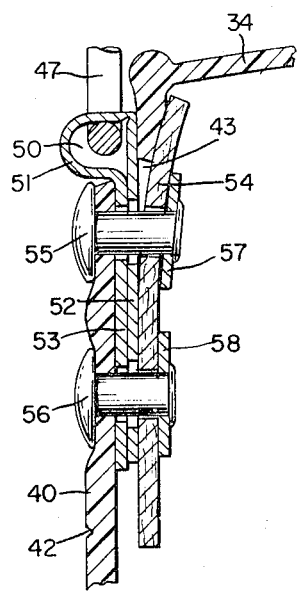
Fig. 14
Fig. 15
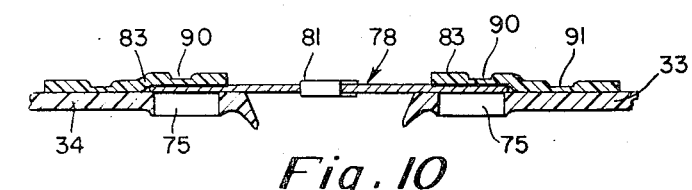
Fig. 10
INVENTOR.
Marvin Schneider

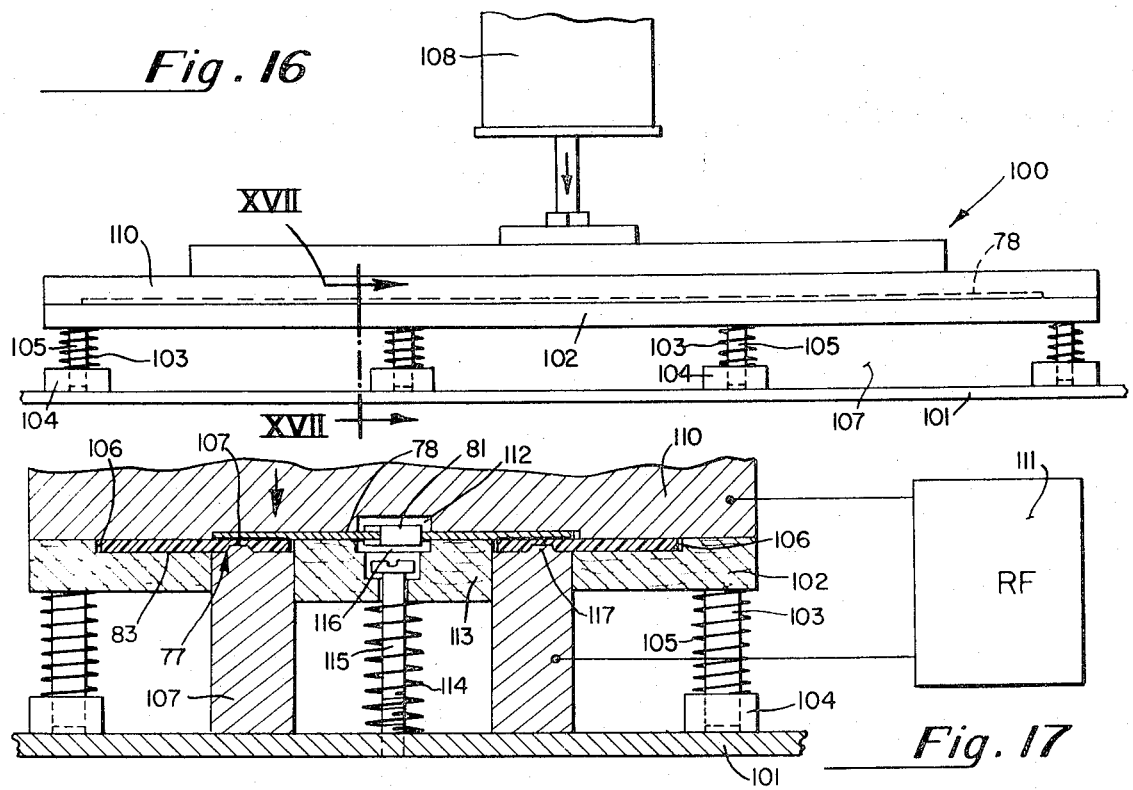
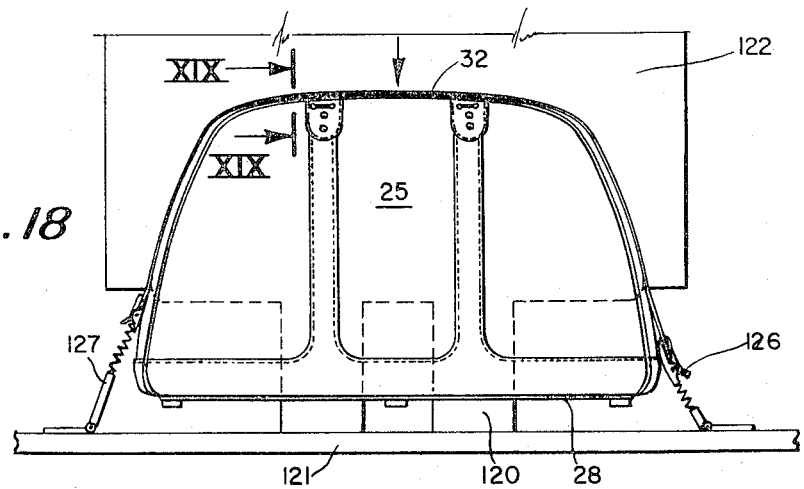
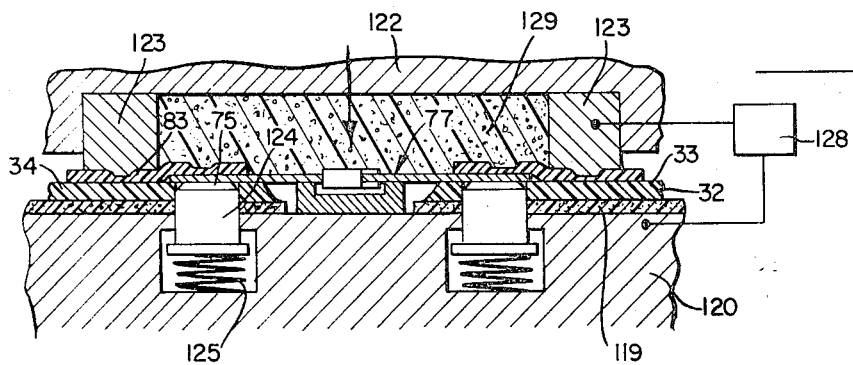

Oct. 9, 1973  M. SCHNEIDER  3,764,433
METHOD OF MAKING A UTILITY BAG
Original Filed Oct. 21, 1968  5 Sheets-Sheet 5

INVENTOR.
Marvin Schneider

United States Patent Office 3,764,433
Patented Oct. 9, 1973

3,764,433
METHOD OF MAKING A UTILITY BAG
Marvin Schneider, Bryn Mawr, Pa., assignor to
Rapid-American Corporation, Clayton, Del.
Original application Oct. 21, 1968, Ser. No. 769,313, now
Patent No. 3,578,115. Divided and this application June
15, 1970, Ser. No. 57,416
Int. Cl. B29c 5/04, 17/10, 24/00
U.S. Cl. 156—245
8 Claims

ABSTRACT OF THE DISCLOSURE

A general utility bag is provided, major components of which are rotationally cast or molded, as an integral monolithic unit, with bottom and closure units being secured thereto by radio frequency heat sealing and wherein other heat sealing operations may be of the radio frequency type. Detail, trim and graining along with simulated stitching is provided as part of the integral molding or casting operation to give the general appearance of a bag constructed of multiple components. Handles are then attached to the bag.

This is a divisional application Ser. No. 769,313, filed Oct. 21, 1968, now Pat. No. 3,578,115.

BACKGROUND OF THE INVENTION

In the bag-making art, as well as in the broader luggage-making field, it has become conventional to construct utility bags such as gym bags and like articles from multiple pieces of pre-cut material requiring laborious stitching operations and the like to connect the various components as well as requiring numerous additional operations for adding desired detail, grain effect and the like. Also, an additional operation has been rejuired to add welting along bag corners.

In many instances, particularly in gym bag construction, it has been found desirable to provide the bags with a water-resistant or moisture-proof quality, due to the particular nature of the numerous articles which would normally be carried in a gym bag, for example, bathing trunks, wet towels, toiletry articles and the like. The addition of such a water resistant or moisture proofing material has generally been effective on the inside of the bag, to prevent defacing the otherwise pleasing appearance of a constructed bag, to facilitate containing moisture-laden articles carried therein and also to protect bag contents from external moisture. This addition of a moisture proof material has generally resulted in a very thin moisture proof material as dictated by economic considerations, requiring for its application an additional finishing operation which can make the construction of a bag prohibitively expensive from a manufacturing standpoint.

Still further, bags of the prior art which have generally been constructed of a fabric or other fibrous material can often result in a rather short life, as the result of the material rotting, due to a highly humid atmosphere to which a bag is normally subjected during use, and further as the result of breaking stitches.

SUMMARY OF THE INVENTION

The present invention seeks to overcome the above and other disadvantages of bag construction, and methods of bag manufacturing in providing a bag, major components of which may be molded as an integral unit, to have welting, trim, simulated grain and stitching, and other aesthetic and structural detail molded into the bag during a single formative molding. The bag bottom and other detail, such as a zipper or other closure unit may then be attached to the bag, preferably by radio frequency heat sealing. The other finishing operations required for the bag are minimal to provide a relatively inexpensive, neat appearing, strong, serviceable, water-proof bag adapted for numerous uses.

Accordingly it is a primary object of this invention to provide a novel method of manufacture of a bag of novel construction which is substantially manufactured as a molded unit requiring a minimum number of assembly or other finishing operations.

It is a further object of this invention to accomplish the above object, wherein welting, grain effect, or other detail may be molded integrally with the formation of the basic bag construction.

It is a further object of this invention to accomplish the above objects, wherein a closure unit may be heat-sealed to the bag preferably in a radio frequency sealing operation, and wherein the closure unit may preferably be a zipper having a moldable material secured thereto as part of a separate operation which may then be attached by heat sealing to the bag as indicated bove.

It is a further object of this invention to provide a novel method of manufacture of the bag which is moisture resistant.

Other objects and advantages of the present invention will be readily apparent to one skilled in the art from a reading of the following brief descriptions of the drawing figures, detail description of the preferred embodiment, and the appended claims.

IN THE DRAWINGS

FIG. 9 is an enlarged fragmentary transverse sectional view of the top of an incomplete bag of this invention taken generally along the line IX—IX of FIG. 5, wherein there is illustrated that portion of the top of the bag which is removed for insertion of the zipper-type closure member.

FIG. 10 is an enlarged sectional view illustrating the zipper-type closure member attached to the bag top of this invention, taken generally along the line X—X of FIG. 8.

FIG. 11 is an enlarged fragmentary transverse sectional view taken through the bottom of the bag of this invention, generally along the line XI—XI of FIG. 7 and wherein the heat-sealed bottom seam and molded feet of the bag are clearly illustrated.

FIG. 12 is an enlarged fragmentary detail view of that portion of FIG. 5 illustrated by the Roman numeral XII, wherein there is illustrated that portion of the bag to which one end of a handle would be attached.

FIG. 13 is an enlarged transverse sectional view of a fragmentary portion of a bag sidewall, taken generally along the line XIII—XIII of FIG. 12.

FIG. 14 is an enlarged fragmentary transverse sectional view through the handle attachment to the bag, taken generally along the line XIV—XIV of FIG. 2.

FIG. 15 is an enlarged sectional view taken through a detail strip illustrated in FIG. 12, generally along the line XV—XV of FIG. 12 and wherein the simulated stitching is illustrated.

FIG. 16 is a side view of the apparatus of this invention for heat sealing the zipper to a strip of moldable material wherein the closure unit of this invention is assembled prior to connection of the closure unit to a bag.

FIG. 17 is an enlarged transverse sectional view taken through the apparatus of FIG. 16, generally along the line XVII—XVII thereof.

FIG. 18 is a side view of another portion of the apparatus of this invention, wherein there is illustrated a means for attaching the completely formed closure member to the bag top according to this invention.

FIG. 19 is an enlarged fragmentary transverse sectional view, taken generally along the line XIX—XIX of FIG. 18 and wherein the manner of attachment of the closure member to bag top portions is clearly illustrated.

Figure 1:
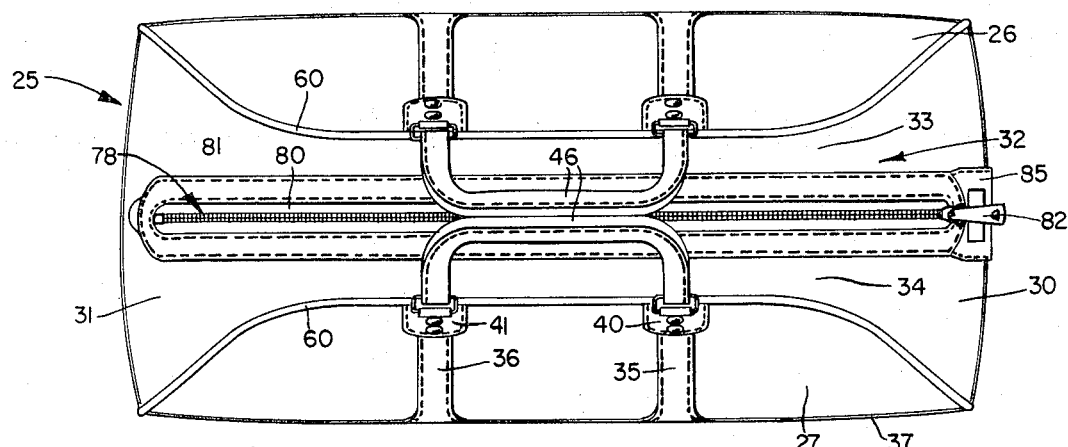
FIG. 1 is a top plan view of the bag of this invention.
Figure 2:
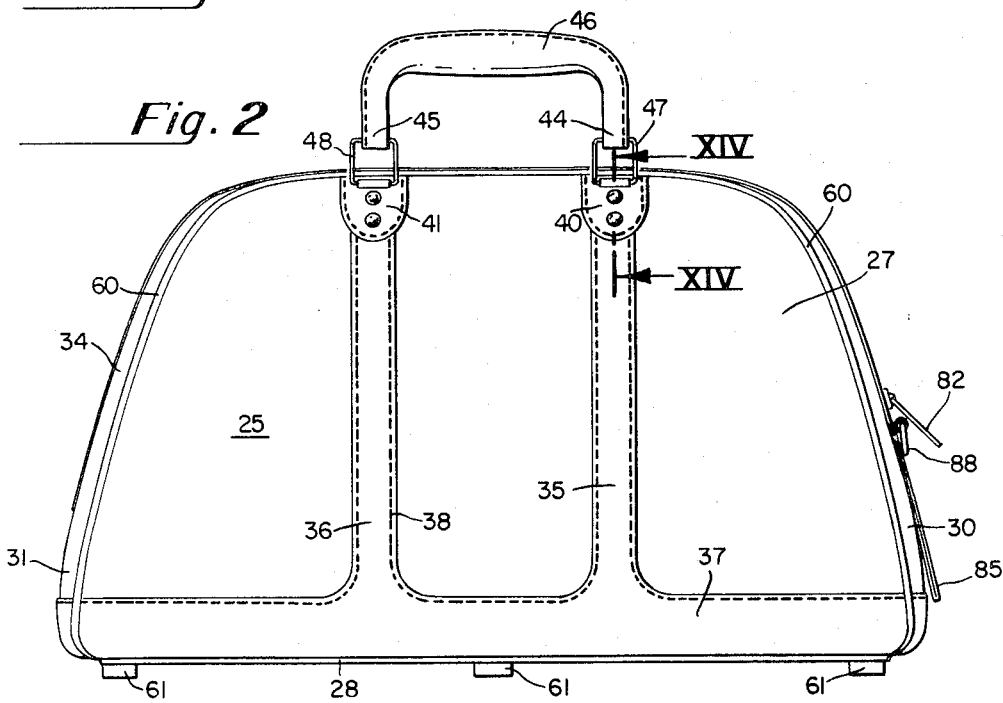
FIG. 2 is a side elevational view of the bag of this invention, wherein integrally molded detail is clearly illustrated.
Figure 3:
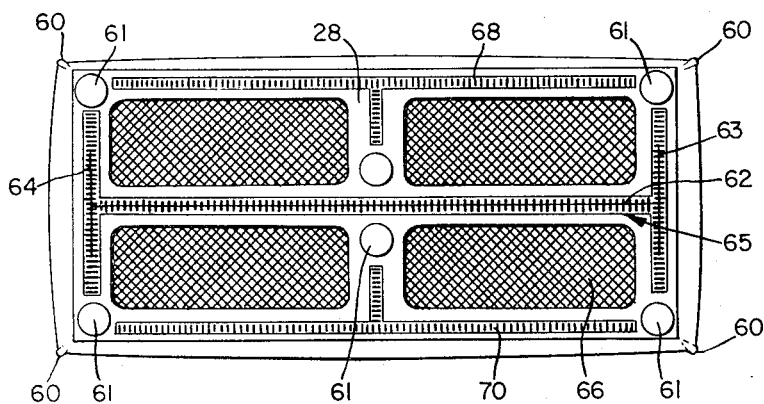
FIG. 3 is a bottom view of a completed bag of this invention.

Referring now to the drawings in detail, reference is first made to FIGS. 1 through 3, wherein there is illustrated a completed bag generally designated by the numeral 25, and comprising sidewalls 26 and 27, a bottom wall 28 (FIGS. 2 and 3) end walls 30 and 31, and a top wall 32 divided into top wall half portions 33 and 34.

Each sidewall 26 and 27 of the bag 25 is provided with a pair of laterally spaced, integral simulated reinforcing strips 35 and 36 extending upwardly from a reinforcing strip portion 37 disposed adjacent to the bottom 28 of the bag, such reinforcing strip detail portions 35, 36 and 37 having simulated stitching recesses 38 therein, formed during the molding process later to be described.

Figure 5:
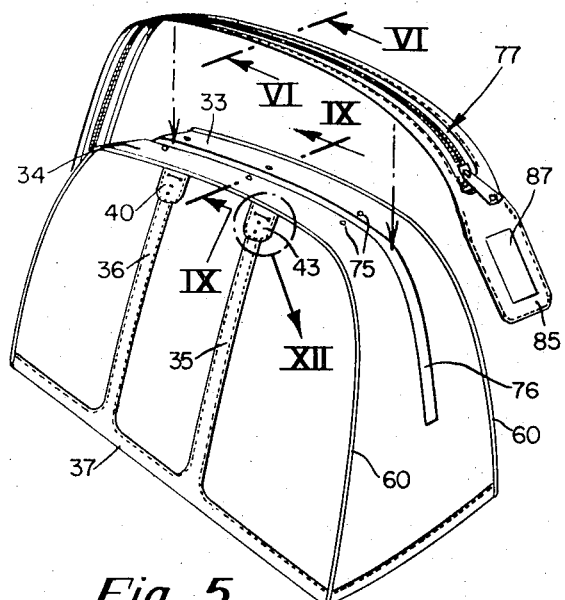
FIG. 5 is a front perspective view of a partially completed bag according to this invention, with the closure unit disposed thereabove, prior to sealing of the closure unit to the top of the bag.

The upper ends of the simulated strips 35 and 36, terminate in simulated handle-attachment portions 40 and 41, respectively, each of which is also provided with simulated stitching indentations 42, and, with particular reference to FIG. 5, each portion 40 and 41 is provided with a transverse slit 43 for facilitating attachment of opposite ends 44 and 45 of a handle 46 thereto. Each handle end 44 and 45 has attached thereto an associated respective link 47 or 48, which, with particular reference to FIG. 14, is pivotally connected within an eye 50 of a closed U-shaped bracket 51. The bracket 51 has legs 52 and 53, the leg 53 extending inwardly of the bag 25 between the leg 52 and the inside of the detail portion 40. Disposed against the inside of the leg 52 is a fibrous, plastic or the like backing plate 54, which extends across the inside of the bag 25 between slits 43 of adjacent handle-connection portions 40 and 41 on a given sidewall 26 or 27 of the bag 25. The plate 54, legs 52 and 53 of the bracket member 51, and handle-connection portion 40 of the bag 25 are connected by a pair of rivets 55 and 56, with associated respective washers 57 and 58 in engagement against the transverse backing plate 54. The washers 57 and 58 may be avoided if certain types of rigid plastic plates 54 are used. Each handle 46 is thus securely attached to its associated bag sidewall 26 or 27.

Welting 60, or simulated beading is provided, at bag junctures, connecting for example, the sidewall 27 with adjacent portions of end walls 30 and 31, and the adjacent portion 33 or 34 of the top wall 32, for providing additional decorative effect as well as reinforcement. This welting 60 is also molded into the bag at the time of its formation, as are the detail strips 35, 36, 37 and the handle-attachment portions 40 and 41 of the detail strips.

The welting 60 may be constructed entirely of a plastisol material, if desired, and may also have a wire insert disposed therein and molded in position if this type of bead reinforcing is desired, although such is not generally necessary. Furthermore, the bead may be constructed as a composite material, one component being a plastisol of a given viscosity suitable for molding (e.g. the same material as used for molding the bag sidewalls), and the other component being a more viscous rigidsol material to result in a rigid bead or welt 60. In accordance with this latter construction, the regidsol may be separately applied to the mold, prior to the molding operation.

The bottom 28 of the bag 25 is provided with a plurality of feet 61 which may be molded internally with the bag bottom 28 at the time of bag bottom casting or molding, and prior to heat sealing closed the bag bottom 28. These feet 61 protrude downwardly from the bottom 28 of the bag, as indicated in FIG. 2, and their protrusion is in the manner simulates separate attachment, as does the protrusion of the welting 60 and strip portions 35, 36 and 37 simulate separate attachment.

Figure 21:
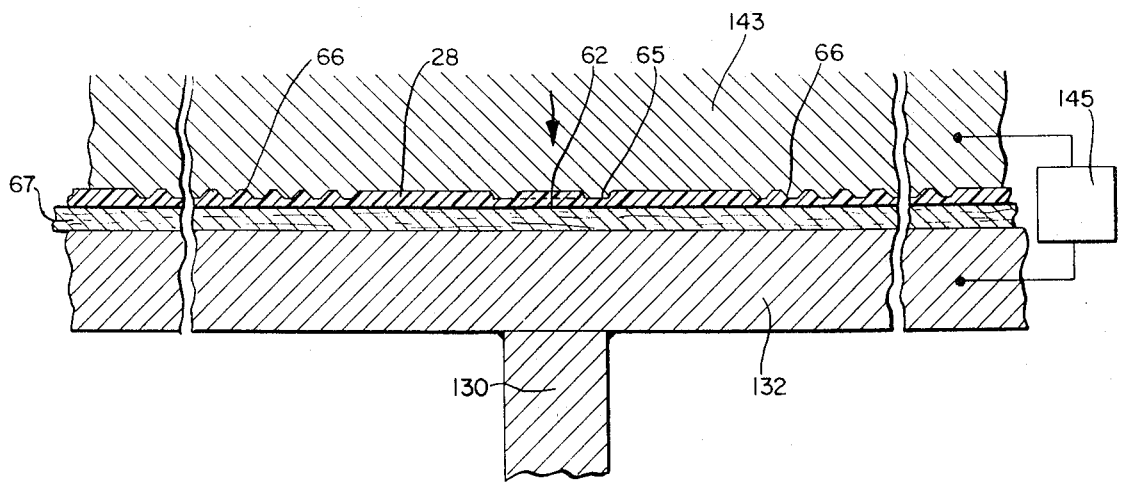
FIG. 21 is an enlarged transverse sectional view of a fragmentary portion of the apparatus of FIG. 20, taken generally along the line XXI—XXI of FIG. 20.

The bottom 28 of the bag 25 is originally provided with a tear seal in the form of an extremely thin connection between opposed halves of the bag bottom which may readily be broken to form a slit 62 therein to facilitate entry of working components therein. The slit 62 is later sealed closed as in FIG. 21. Simultaneously with the sealing of the slit 62, with an appropriate die to provide simulated stitching, transverse slits 63 and 64 (which are also formed by breaking a tear seal of thin material) are also sealed to provide a simulated stitching or grid work generally designated by the numeral 65 on the bottom 28 of the bag, and having an I configuration.

Figure 7:
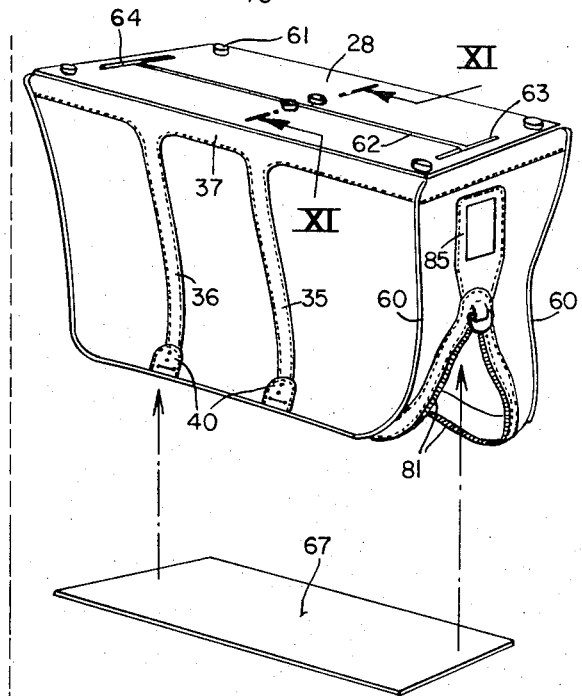
FIG. 7 is a front perspective view of an inverted partially completed bag of this invention, wherein a bottom reinforcing panel is also illustrated prior to disposition of the panel into the bag.
Figure 8:
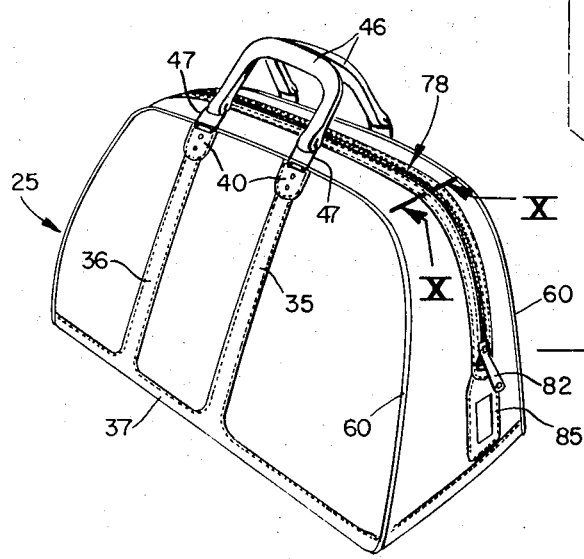
FIG. 8 is a front perspective view of a completed bag, according to this invention.

Simultaneously with the formation of the feet 61, grid work patterns 66 may be provided, but preferably such patterns 66 may be provided at a later time simultaneous with the sealing of a reinforcing board 61 (FIGS. 7 and 21) of plastic, fibrous material or the like as desired, to the interior of the bag bottom 28, the board 67 (preferably a fibrous board) having been pretreated with a heat-sealing substance. Preferably, the formation of the simulated stitching or grid work 68 and 70, on the bottom 28 of the bag 25 ,the sealing of the slits 62, 63 and 64, and the securing of the reinforcing board 67, to the bottom 28 of the bag 25 are effected concurrently.

With particular reference to FIG. 9, it is seen that the top 32 of the bag 25 is originally molded with a center portion 72 therein (illustrated in phantom) extending longitudinally thereof, but having notches 73 and 74 on opposite sides to facilitate ready removal thereof. Also, a number of holes 75 are molded in the top 32, for a purpose later to be described. The strip 72 is readily removable, to define an access opening 76 in the top 32 of the bag 25. It is about this opening 76 which the closure member 77 (FIG. 5) is applied.

Figure 4:
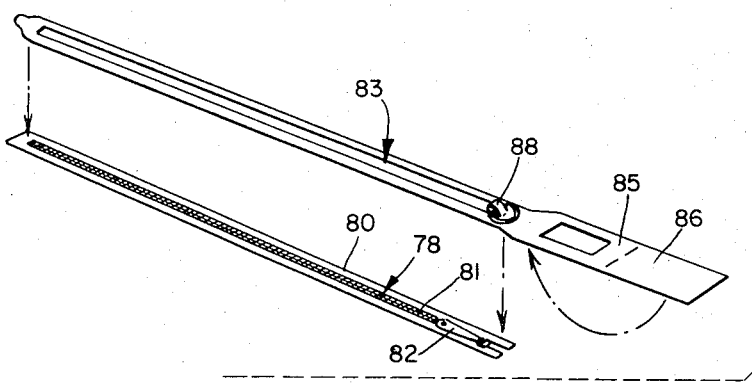
FIG. 4 is an exploded view of a zipper-type closure unit of this invention, prior to heat-sealing of the zipper to its molded strip.
Figure 6:
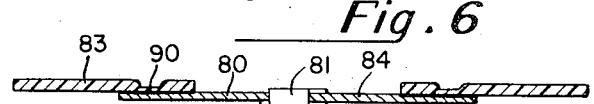
FIG. 6 is an enlarged transverse sectional view through the closure unit of this invention, taken generally along the line VI—VI of FIG. 5.

The closure member 77 is constructed of a zipper 78 comprising a conventional fabric portion 80 having metal teeth 81 and a metal pull 82, the zipper 78 being heat sealed by engagement of the fabric portion 80 thereof with a strip 83 of moldable material having an elongated slot 84 therein and an elongated tab 85, forming a part thereof. The tab 85 has an end portion 86 which is foldable back upon itself as indicated in FIG. 4, to be sealed thereto to form a closed window 87 to receive an identification tag or the like. A hook 88 may also be carried by the strip 83 as illustrated in FIG. 4, for locking the zipper member 78 shut by locking the hook member 88 to the pull 82,, in a conventional manner. When the zipper 78 is secured to the strip 83, and the heat sealing operation which is later to be described is completed, the zipper 78 is secured to the strip 83 along a continuous sealing line 90 which simulates stitching.

The closure 77 is then secured to the top 32 of the bag 25, along opposite side portions 33 and 34 thereof, about the opening 76 and partially over the end wall portions 30 and 31 which surround the end portions of the opening 76, also in a heat-sealing operation which is later to be described but which appears when finished to comprise simulated stitching 91 along the seal thereof as illustrated in detail in FIG. 10. The tab 85 remains unsecured to the bag end wall 30.

It will be noted that the zipper could be of the type which lends itself to being molded integrally to the bag top portions 33 and 34, at the time of their molding, if desired, by the placing of a moldable zipper unit into a mold during the bag molding operation.

In FIGS. 16 and 17, there is illustrated the apparatus 100 for sealing the zipper 78 to the strip 83 to provide the closure 77.

The apparatus comprises a base plate 101 upon which is carried a bottom die member 102, generally of non-heat transmissive material such as nylon or a plastic having a high melting temperature, the member 102 being resiliently carried by lugs 103, which in turn are carried by bosses 104 mounted on the base plate 101 with compression springs 105 disposed between the member 102 and the bosses 104 as illustrated in FIG. 17. The member 102 is provided with a recess 106 for receiving outermost portions of the strip 83 with the inner-most portions of the strip 83 being disposed over a bottom die member 107 which extends entirely around the inner periphery of the strip 83 at the lower surface thereof, the die member 107 having radio frequency heating capabilities for providing heating of the strip 83 when a piston 108 is actuated bringing an upper die member 110, also of radio frequency energy-absorbing qualities downwardly toward the die member 107, at which time a radio frequency generator 111 is actuated to effect a heat sealing of the zipper 78 onto the strip 83, as illustrated in FIG. 17. A recess 112 is provided in the central portion of the die 110 to accommodate metal portions 81 of the zipper 78. The center portion of the zipper 78 is supported by a bottom die member 113 also of nylon or plastic construction and not capable of transmitting radio frequency energy, the member 113 being resiliently supported by a spring 114 disposed about a screw 115 carried by the base plate 101. A void 116 is also provided for the bottom of the metal portions 81 of the zipper 78. It will be noted that protrusions 117 of the lower die member 107 provide the recesses 90 which, when the closure member 77 is completely sealed and inverted from the position illustrated in FIG. 17 comprise a simulated stitching effect.

With particular reference to FIGS. 18 and 19, the completed closure member 77 is secured to the top wall 32 of the bag 25 by heat sealing by means of radio frequency energy of the closure member 77 to opposite sides 33 and 34 of the access opening 76. In this regard, a bottom die 120, constructed of a material capable of absorbing radio frequency energy, such as steel, is carried on a base plate 121 and is inserted up through the slit 62 in the bottom 28 of the bag 25, to engage beneath the top wall 32 thereof.

An upper die 122 is then brought down over the top 32 of the bag 25, the upper die 32 conforming generally to the configuration of the top of the bag as viewed in the side view FIG. 18 and with upper die member 122 carrying radio frequency energy transmission elements 123. A plurality of plungers 124 are carried by the lower die member 120, and are spring biased upwardly by means of springs 125 for urging the plungers 124 into the locating voids 75 of the bag top 32 for precisely locating the bag 25 on the die member 120.

The closure member 77 is maintained in place during the downward movement of the die 120 by suitable spring-biased attachment devices 126 and 127 carried by the base plate 121 and maintaining the closure member 77 against the top 32 of the bag 25. A radio frequency generator 128 which may or may not be the same as the generator 111 is electrically connected to the members 123 and 120 for generating sufficient energy to heat seal or mold the strip 83 to the top wall 32 of the bag 25.

As the upper and lower dies 122 and 120 respectively are moved toward one another, relatively, deformable foam die coverings 119 and 129 on the adjacent lower and upper die surfaces provide die deformation to offset bag irregularities in walls 32 and 34, and to assure against extrusion of bag wall portions 32 and 34 because of the irregularities.

Figure 20:
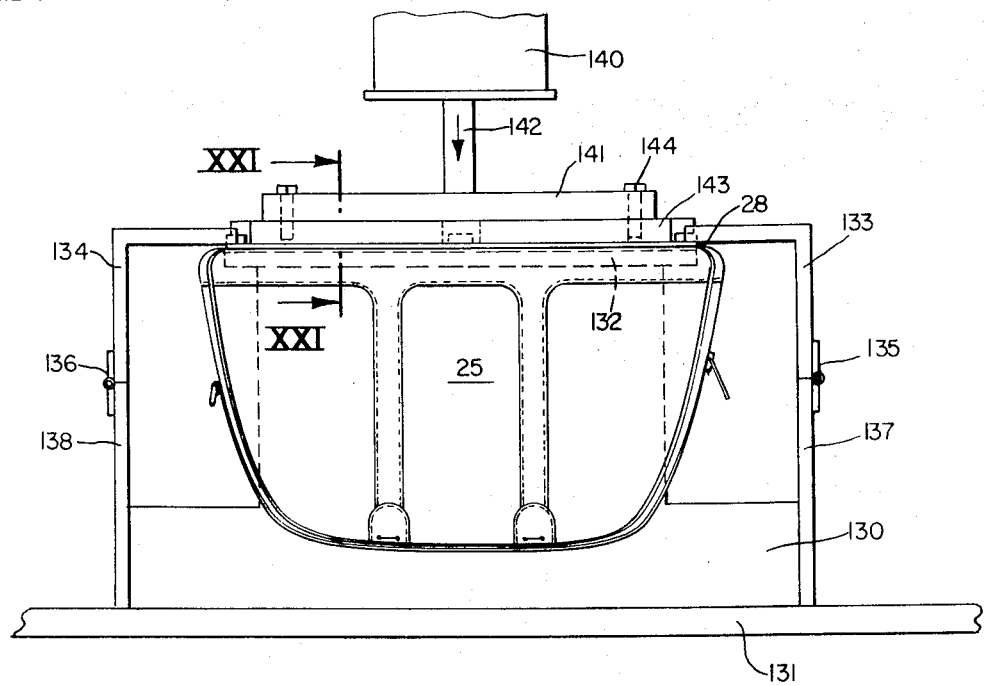
FIG. 20 is a side elevational view of a portion of the apparatus of this invention wherein a reinforcing panel is heat-sealed to the bag bottom of this invention.

The next step is to insert the rigidifying bottom board 67 into the bag 25 and to seal the same into position and to close the slit 62 as well as the cross-slits 63 and 64 in the bottom of the bag and also to apply the simulated stitching 68, 70 and 65 to the bottom of the bag as well as the simulated grid-work 66. This is all accomplished in a simultaneous operation by the apparatus indicated in FIGS. 20 and 21.

The bag support 67 is placed inside the bag 25 and the bag 25 is inverted over a lower die member 130 carried on a base plate 131. The lower die member 130 carries an upper portion 132 which is capable of transmitting radio frequency energy. A pair of pivotally movable clamp members 133 and 134 are mounted on respective hinges 135 and 136 carried by upstanding members 137 and 138, respectively, which in turn are secured to the base plate 131, the clamp members 133 and 134 being operative to retain the bag 25 in position over the lower die member 130. When the bag 25 is thus placed over the lower die member 130, the pivotal members 133 and 134 are brought into engagement against the bottom 28 of the bag to retain the same in position. A piston 140 is actuated to drive an upper die 141 vertically downwardly as illustrated by the arrow 142 in FIG. 20, with the upper die 141 having a die plate 143 attached thereto by means of bolts 144. The plate 143 is of a material capable of absorbing radio frequency energy and when brought into contact with the bottom 28 of the bag 25, the radio frequency generator 145 is energized to heat seal between the die plate members 132 and 143 thereby sealing the board 67 to the bottom 28, sealing closed the slit 62, as well as the slits 63 and 64 applying the simulated stitching configurations 65, 68 and 70 and forming grid-work 66, if desired.

The bag 25 is at this point almost completely formed, with the exception of applying the handles 46 in a conventional manner.

It will be appreciated that the principal material of construction of the bag 25 of this invention is a material which must be readily heat-sealable preferably by radio frequency energy and therefore, many plastic, vinyl, rubber-like or latex-like materials are suitable materials for such heat sealing as well as being suitable materials for rotatable casting or molding to form either a pliable or rigid product. It will also be noted that the radio frequency generator may be a conventional unit, such as any of those commercially available which will generate sufficient energy to perform the desired heat sealing functions and render plural components of bag-forming materials to be integral parts of a monolithic molded structure when such materials are secured together.

It will be apparent that various modifications may be made in the construction of the bag of this invention as well as in the method of manufacture, all within the spirit and scope of the invention, as defined in the appended claims. Some such other methods may comprise forming the basic bag construction by other means well known in the art, as by slush casting, blow molding, or injection molding and the like.

What is claimed is:

1. A method of making a bag of moldable material comprising the steps of molding a bag construction as a one piece unit comprising opposed side walls, end walls, a top wall and a bottom wall, providing longitudinal openings in two of said walls, heat sealing a closure unit to one of said walls which are provided with a longitudinal opening to permit access to the interior of said bag construction, said step of heat sealing comprising placing said closure unit and said wall to which it is secured between first and second heat sealing dies, one of said dies extending through said other longitudinal opening to underlie said closure unit and said last named wall, and said other die overlying said closure unit and said last named wall, removing at least said one die from said other longitudinal opening, and heat sealing closed said other longitudinal opening.

2. The method of claim 1 wherein said one longitudinal opening is in said top wall, and said other longitudinal opening is in said bottom wall.

3. The method of claim 1 including the steps of initially providing a mold, said mold having walls that correspond to said opposed side walls, end walls, top wall and bottom wall of said bag construction, and forming welting at the juncture of at least some of said walls of said bag construction by applying a highly viscous bead-forming material to the junctures of the corresponding walls of said mold prior to the step of molding said bag construction.

4. The method of claim 1 wherein the heat applied during the heat sealing steps is provided by radio frequency heating.

5. The method of claim 1 wherein the molding step comprises rotatable casting of a moldable material into a bag-like formation.

6. The method of claim 1 wherein said closure unit is formed by the step of heat sealing a strip of moldable material to portions of a zipper prior to heat sealing the closure unit to said one wall.

7. The method of claim 6 wherein the step of heat sealing the strip of moldable material to the zipper portions comprises applying heat by radio frequency heating.

8. The method of claim 5 wherein said casting step includes molding welting to bag wall junctures, and molding protruding detail strips onto bag sidewalls in a single casting operation.

References Cited

UNITED STATES PATENTS

| | | | |
|---|---|---|---|
| Re. 24,166 | 6/1956 | Stiller | 150—37 |
| 2,658,543 | 11/1953 | Budnick | 156—66 X |
| 2,753,599 | 7/1956 | Pietraszek et al. | 264—45 |
| 3,345,226 | 10/1967 | Frenkel et al. | 156—66 |
| 3,474,165 | 10/1969 | Rakes et al. | 264—312 |
| 3,561,073 | 2/1971 | Rosser | 156—66 X |
| 2,471,612 | 5/1949 | Freeman | 190—53 UX |
| 2,475,277 | 7/1949 | Budnik | 190—41 Z UX |
| 2,868,254 | 1/1959 | Saad | 150—37 X |
| 3,254,688 | 6/1966 | Everburg | 150—42 X |
| 3,339,781 | 9/1967 | Schurman et al. | 190—48 X |

FOREIGN PATENTS

| | | | |
|---|---|---|---|
| 686,334 | 5/1964 | Canada | 156—245 |
| 210,161 | 3/1956 | Australia | 190—41 R |

ALFRED L. LEAVITT, Primary Examiner

T. E. BOKAN, Assistant Examiner

U.S. Cl. X.R.

156—66, 212, 252, 256, 273; 264—156, 310